US009809972B2

(12) United States Patent
Angeli et al.

(10) Patent No.: US 9,809,972 B2
(45) Date of Patent: Nov. 7, 2017

(54) ELEMENT FOR THE CONNECTION OF BUILDING COMPONENTS, PARTICULARLY PANELS AND BEAMS

(71) Applicant: Rotho Blaas srl GmbH, Cortaccia (IT)

(72) Inventors: Albino Angeli, Commezzadura (IT); Giovanni Dal Ri, Taio (IT); Andrea Polastri, Dambel (IT)

(73) Assignee: ROTHO BLAAS SRL GMBH, Cortaccia (BZ) (IT)

( * ) Notice: Subject to any disclaimer, the term of this patent is extended or adjusted under 35 U.S.C. 154(b) by 0 days.

(21) Appl. No.: 14/156,699

(22) Filed: Jan. 16, 2014

(65) Prior Publication Data

US 2015/0198188 A1 Jul. 16, 2015

(51) Int. Cl.
| E04B 1/38 | (2006.01) |
| E04B 1/26 | (2006.01) |
| E04B 1/04 | (2006.01) |
| E04B 1/10 | (2006.01) |
| E04B 1/21 | (2006.01) |
| F16B 43/02 | (2006.01) |

(52) U.S. Cl.
CPC ............ *E04B 1/2604* (2013.01); *E04B 1/043* (2013.01); *E04B 1/10* (2013.01); *E04B 1/215* (2013.01); *F16B 43/02* (2013.01)

(58) Field of Classification Search
CPC .......... F16B 5/02; F16B 43/02; E04B 1/2604; E04B 1/215; E04B 1/10; E04B 1/043; E04B 43/02

USPC .................... 52/701, 293.3, 167.1
See application file for complete search history.

(56) References Cited

U.S. PATENT DOCUMENTS

| 2,165,500 | A | * | 7/1939 | Muirhead | ........................ 52/101 |
| 2,396,836 | A | * | 3/1946 | Ellinwood | ................... 174/135 |
| 2,425,935 | A | * | 8/1947 | Hayman | ...................... 174/135 |
| 3,852,931 | A | * | 12/1974 | Morse et al. | ................ 52/293.3 |
| 3,854,684 | A | * | 12/1974 | Moore | ......................... 248/68.1 |
| 4,856,250 | A | * | 8/1989 | Gronau et al. | .................. 52/480 |
| 5,118,069 | A | | 6/1992 | Muhlethaler | |
| 5,388,380 | A | * | 2/1995 | Niese | .............................. 52/480 |
| 2015/0167709 | A1 | * | 6/2015 | Buchta | .......................... 411/546 |

FOREIGN PATENT DOCUMENTS

| DE | 2150566 | | 4/1973 | |
| EP | 0442243 | A1 | 8/1991 | |
| EP | 2216455 | A2 * | 8/2010 | ............... E04B 5/12 |
| EP | 2243887 | A2 | 10/2010 | |

* cited by examiner

*Primary Examiner* — Basil Katcheves
(74) *Attorney, Agent, or Firm* — Jacobson Holman, PLLC (57) ABSTRACT

A connection means for building components is described. According to the invention, a connection means can be arranged opposite on the external surface of a building component, having a body, this body comprising a case and containing at least one filling material within said case, where said filling material is more elastic than the material forming said case, said case and said filling material being adapted to receive at least one through anchoring element which can be fixed to said building element.

10 Claims, 10 Drawing Sheets

ELEMENT FOR THE CONNECTION OF BUILDING COMPONENTS, PARTICULARLY PANELS AND BEAMS

The invention relates to an element for the connection of building components, particularly panels and beams.

A plurality of solutions for the connection of building panels to other building panels or other elements, such as for example beams or the connection of beams to each other, is known. For example, it is possible to glue the building components to each other.

In another solution, the elements are first connected to building components and later fixed to each other.

For example, from EP 2 243 887 elements which are fixed spaced apart on the surface of a building element are known. These lath elements have a trapezoidal shape and on the inclined sides they have inclined drilled through holes. These holes are arranged in a such a way that also the head of the screw is inserted so as to completely house the head. In this way, the head of the screw is in a flush alignment with the inclined surface. Above the head of the screw a cover is arranged in order to prevent any strikes.

This system is very complex and it also requires minimum clearance. If the clearance between the head and the cover is too large, the strained screw might be loose and therefore have less resistance. All the loads, both tensile and compressive, are concentrated on the head of the screw and there is no direct interaction between the connection element and the surface.

EP 0 442 243 describes an assembling and disassembling device which comprises at least one acoustic insulation element.

The acoustic insulation element described in EP 0 442 243 aims to reduce the effects of sound transmission. The solution to the problem is to reduce the sound transmission capacity.

The problem raised is solved by the device described, the noise reduction and the acoustic insulation.

DE 2150566 describes a device for supporting façade elements, such as a textile decorative façade. The device facilitates mounting.

The element for the connection of building components according to the invention aims to rapidly create a stable connection where the loads are distributed across a surface.

This aim is achieved by means of an element for the connection or building components which is arranged opposite on the surface of the building component which comprises a body, this body comprising a case and having filling material where said filling material is more elastic that the material forming said case, said case and said filling material being adapted to receive through anchoring means which can be fixed into said building components.

The body of the element according to the invention has a case. This case, made for example of metal, aims to guarantee the stability of the entire element. The filling mass is in contact with the anchoring means, for example a screw. This contact can be obtained by a thread arranged in the through hole in the filling material or it can be obtained by the anchoring means itself which has been screwed through the filling mass. The contact can be obtained the adhesion of the filling mass to the anchoring element should said filling material be a cementing material. The cementing material can for example be a foam or a resin which is inserted into the case after performing the connection.

In a preferred embodiment, the anchoring elements are positioned in a dovetail arrangement, that is inclined or crossed so as to have a larger gripping surface.

The advantage of the element according to the invention is in particular that the structure, that is the case, gives stability and stiffness to the entire element, while the central area absorbs the loads. The central area with the filling mass absorbs the loads which would otherwise be absorbed by the head of the anchoring element.

The element according to the invention can for example be used to be fixed to a wooden panel. The element according to the invention is fixed by means of a series of anchoring elements to the panel. This fixing can be performed at the factory and does not have to be performed on site. The anchoring elements are fixed for example in a cross arrangement forming a dovetail. This type of fixing allows the perfect distribution of the load both within the panel and within the element according to the invention. This type of fixing allows the creation of a symmetrical connection system with respect to the central plane of the panel, where the forces are symmetrically transferred from the panel to the connection element. The connection element according to the invention can have for example a metal case, for example steel, and as filling mass for example an aluminium insert or a wood insert, or alternatively a plastic resin or plastic foam for example a high density polyethylene.

A wood insert is particularly suitable since the anchoring elements can be wood screws.

In the filling mass a threaded hole can already be envisaged which allows better insertion of the anchoring element into the mass or alternatively the anchoring element can be inserted for example by screwing it and gripping the material directly.

The connection element according to the invention can also have some holes adapted to provide a gripping point for the panel to which the connection element is fixed. Moreover, means can be envisaged adapted to connect various connection elements to each other soon to ensure a stable and secure connection between various building components.

Further characteristics and details will become apparent from the appended claims and drawings.

In the drawing:

FIG. 7 is a lateral view of FIG. 6, FIGS. 8, 9, 10 and 11 show a series of sections of different connection elements.

A connection element 1 consists of a body. This body comprises a case 2 and contains filling material 3 within said case.

The connection element 1 is formed so as to be able to house a through anchoring element 10. The connection element is fixed onto the external surface of the building component, opposite the surface. This through anchoring element 10 can be a screw for example. The anchoring element 10 passes at least through two walls 2a, 2b. In this way, the case 2 makes the connection stiff, while the filling 3 provides the connection with elastic resistance. Moreover, the filling material 3 allows the fixing of the anchoring element 10 along the entire passage area within the connection element 1. The anchoring element 10 is inserted into the building component 100 which can be a wooden panel for example. Advantageously, the anchoring element or the anchoring elements are inserted inclined so as to guarantee better fixing. The anchoring element can be inserted into the connection element 1 according to the invention in appropriate holes or it can create a hole for example. The hole where the anchoring element 10 is inserted can also be threaded.

In a further embodiment, the case can be empty and only after fixing the anchoring element or the anchoring elements both to the connection element and to the panel 100, the space 3 is filled with a resin for example.

In a different embodiment, the space 3 is filled with wood or a wood composite for example. In a further embodiment the case can be empty and contain a second body having some compartments which will be filled with a resin for example only after fixing the anchoring element or the anchoring elements.

In a further embodiment, the case can be empty and contain a body having compartments in which capsules are located which are drilled and crossed by the anchoring elements. The connection element 1 can have gripping points to facilitate the movement of the panel 100 with the connection element 1.

Moreover, in one embodiment there may be gripping points which allow the fixing of other connection elements by means of a connection element such as for example a poly-orthogonal plate, so as to be able to securely connect a series of panels 100 and/or building components.

The building component can be a wooden component and/or a component consisting of several layers forming a multilayer called sandwich panel. The connection element 1 according to the invention can be connected for example to an already existing external element such as for example an element arranged in a concrete foundation or steel beams already existing in the building.

The connection element can also connect two beams for example, being arranged on the end part of the beam. In this way, the connection element can create a concealed connection, that is, there should not be any laterally projecting elements from the connection. This allows all stresses to be within the beam section. In this way, the beams can be better sized. Moreover, the load is arranged within the section of the beams.

Figure 1:
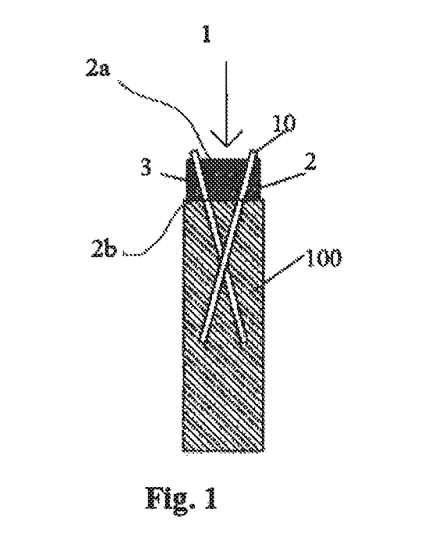
FIG. 1 shows a front section of a connection element according to the invention fixed by means of anchoring elements to a panel.
Figure 2:
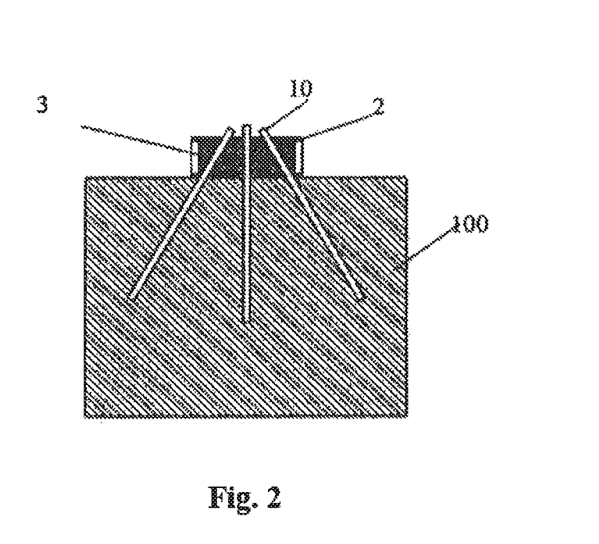
FIG. 2 shows a side section of a connection element according to the invention fixed by means of anchoring elements to a panel.
Figure 3:
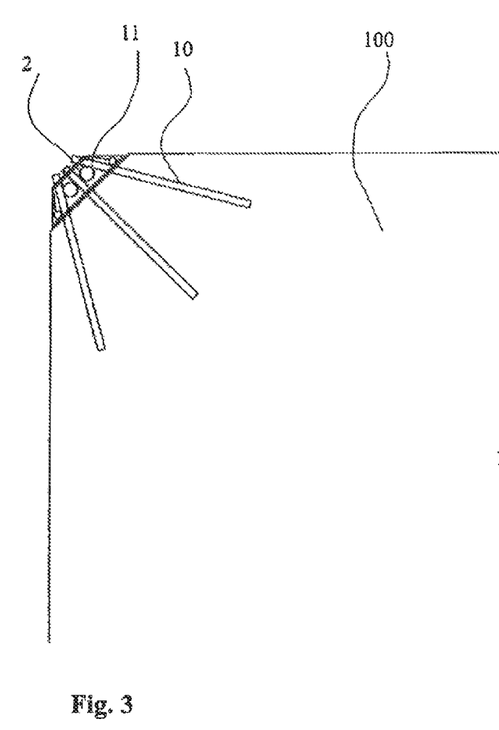
FIG. 3 shows a side view of a connection element fixed to a panel.
Figure 4:
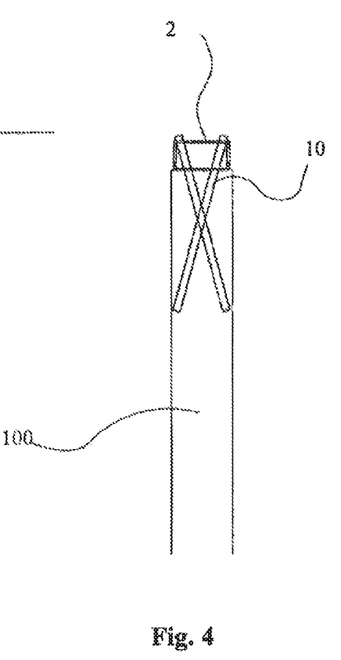
FIG. 4 shows a section of a connection element fixed to a panel.
Figure 5:
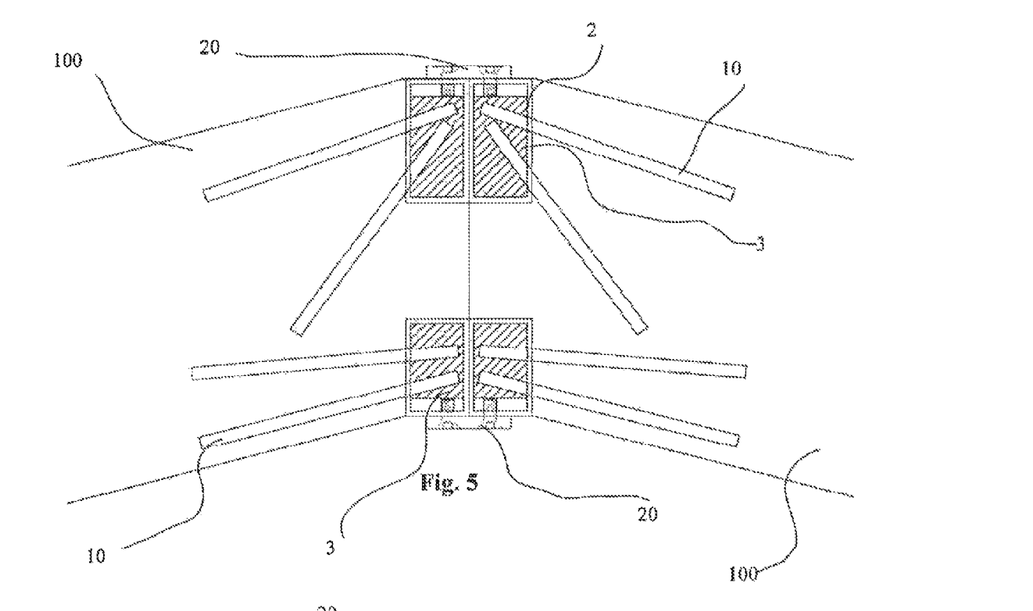
FIG. 5 shows a beam-beam connection at an inclined angle and a straight beam-beam connection.

As shown in FIG. 5, the beam-beam connection can be aligned or inclined. In FIG. 5 there is a connection means 20 which connects the two connection elements 1 which are fixed by means of anchoring elements 10 onto the building element 100.

Figure 6:
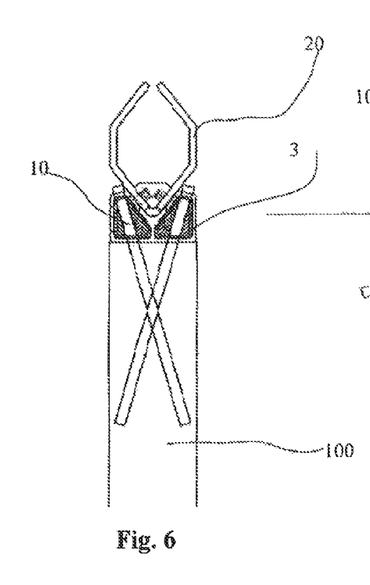
FIG. 6 shows a section of an M-shaped profile closed at the bottom by a connection plate fixed to a panel.
Figure 7:
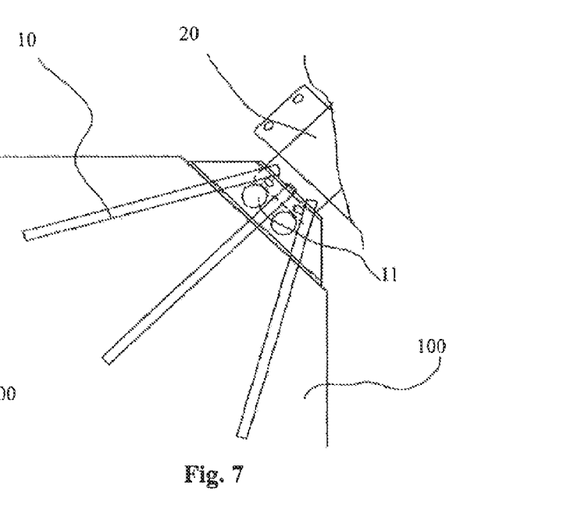
Figure 8:
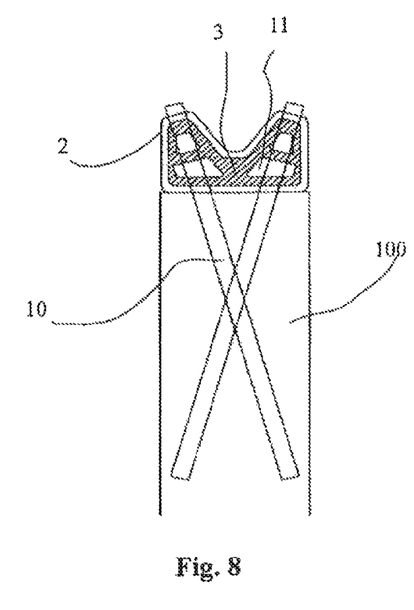

In FIGS. 6 and 7 a connection element 1 is shown fixed onto the building element 100. The connection element 1 has the shape of an M closed at the bottom and connection means 20 are connected onto it, particularly a folded plate so as to adapt to the shape of connection element 1.

The connection element also allows other building elements to be easily fixed. For example, a ceiling can be easily connected to the junction between the two beams.

Finally, the connection element according to the invention allows the anchoring elements to be oriented in any way ensuring excellent fixing at the same time.

The connection element according to the invention can be used to connect wooden panels or panels consisting of several layers of wood, beams, wooden beams or also other elements, such as for example concrete and reinforced concrete panels, multi-layer panels or polymeric panels.

The anchoring element 10 can consist of wood screws or resin-coated bars if the connection element is used on wooden building elements or can consist of reinforcement bars if the connection element is used on building elements made of reinforced concrete.

In order to easily and rapidly produce the case, an extrusion process can be used, for example. From the thus obtained extruded profile the connection element according to the invention is later cut to the required width.

The case 2 can be also formed by folding a sheet for example a metal sheet.

Figure 9:
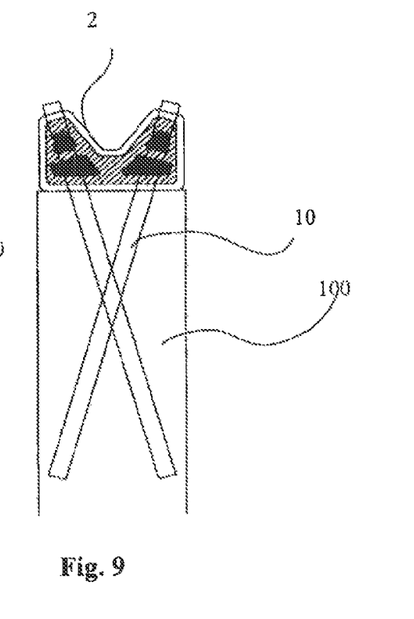

FIGS. 8, 9, 10 and 11 show embodiments of the connection element according to the invention. FIG. 9 shows a connection element 1 fixed to a panel 100 by means of anchoring means 10. The case 2 is M-shaped with a closed bottom. The filling material does not completely fill the case 2. For example, openings 11 are provided. These openings can be used for example to fix means adapted to move the connection element 1 with the panel 100 or they can simply be used to save material, but they can also be used to discharge the shavings generated while inserting the anchoring element 10 or while performing the threading.

Figure 12:
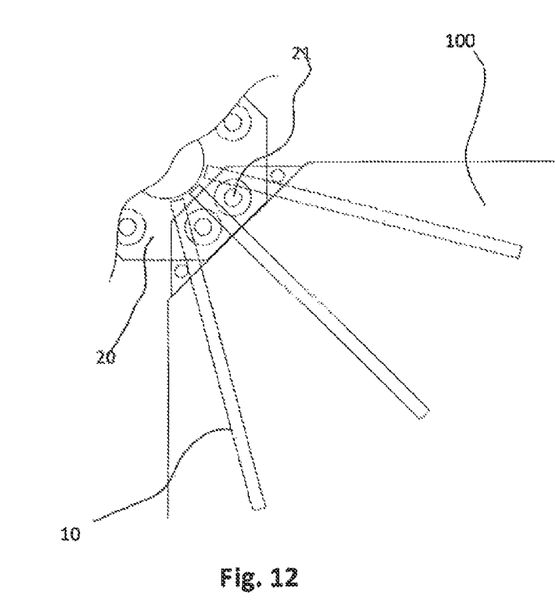
FIG. 12 shows a view of a connection element fixed to a panel with a connection plate.
Figure 13:
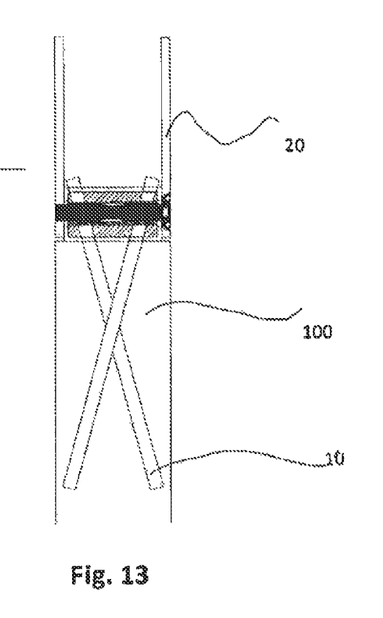
FIG. 13 shows a section of FIG. 12.

FIGS. 12 and 13 snow a connection element 1 fixed to connection means 20 by means of fixing means 21. This fixing means is for example a bolt which can screw both plates; working only from the inside of the building it is possible to obtain a connection with mechanical ductility characteristics since the bolt 21 is lathed in the central area and it is further possible to eliminate any clearance of the bolt hole using an eccentric tube or a resin capsule interposed between the bolt 21 and the filling material 3.

Figure 14:
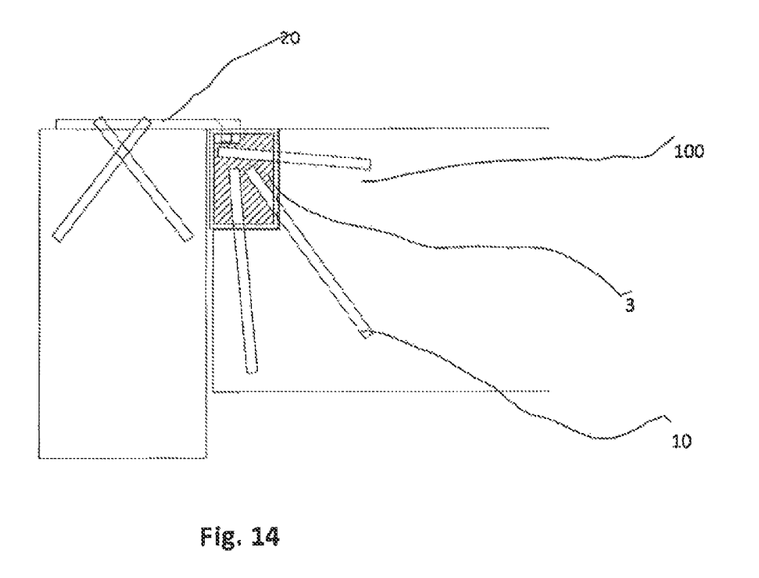
FIG. 14 shows a beam building element connection.
Figure 15:
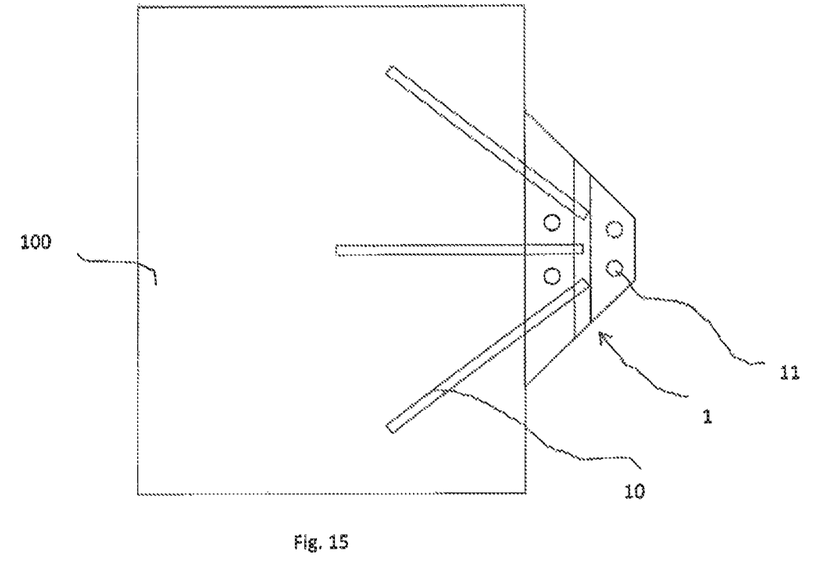
FIG. 15 shows a view of a connection element.
Figure 16:
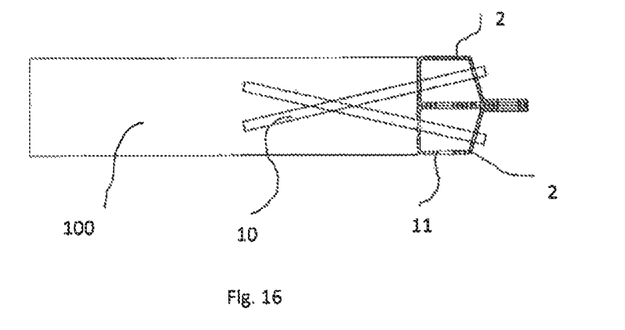
FIG. 16 shows a section of the view of FIG. 15.

FIG. 14 shows a connection between a beam with a connection element fixed on the building element 100 and a second building element.

In a further preferred embodiment, the filling material 3 can be wood or compressed wood chipboard.

Figures 10, 11:
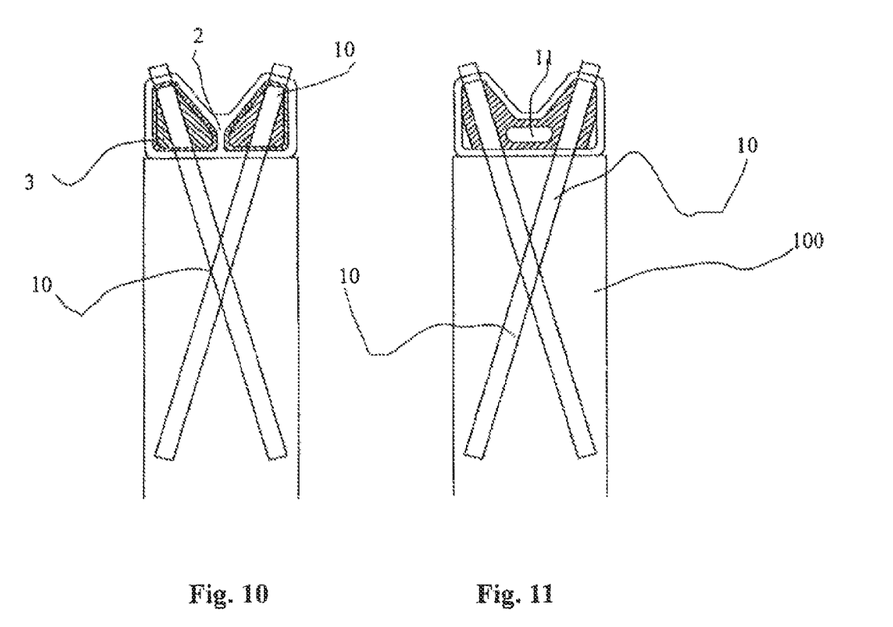

FIG. 11 shows a further embodiment of connection element 1 according to the invention. The element according to this embodiment is split into two different chambers; in each chamber anchoring elements 10 are arranged. Between the two chambers, a housing for a connection means 20 is interposed. This housing for a connection means 20 is fixed by means of fixing means 21 by closing also the two parts of the connection element.

Figure 17:
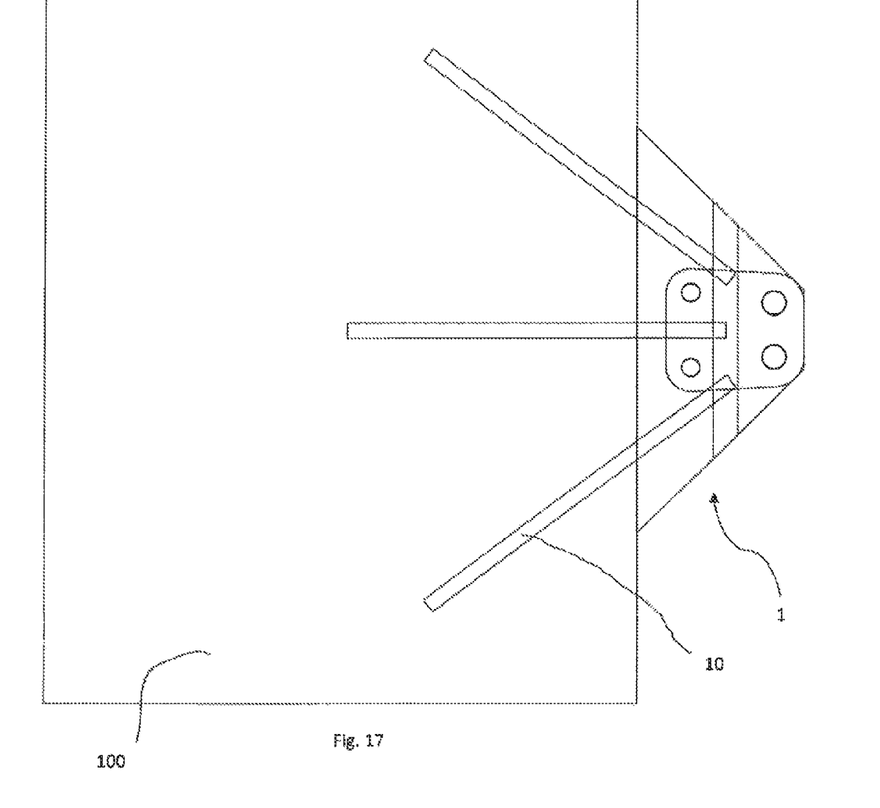
FIG. 17 shows a view of a connection element.
Figure 18:
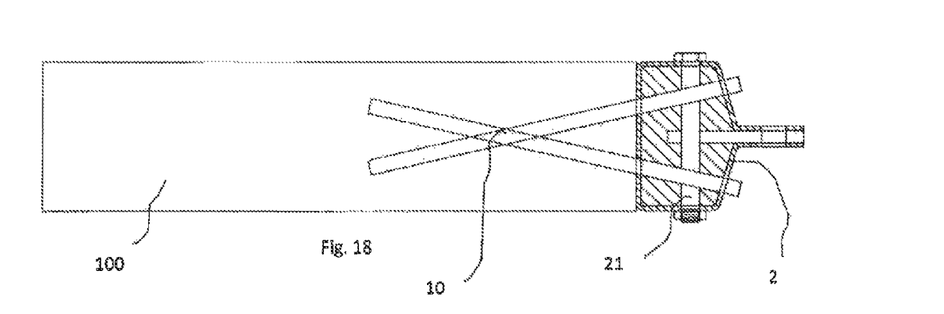
FIG. 18 shows a section of the view of FIG. 17.

FIGS. 17 and 18 show a further embodiment, with the housing for the connection means 21 located in the chamber of the connection element 1 and clamped with the fixing means 21.

Figure 19:
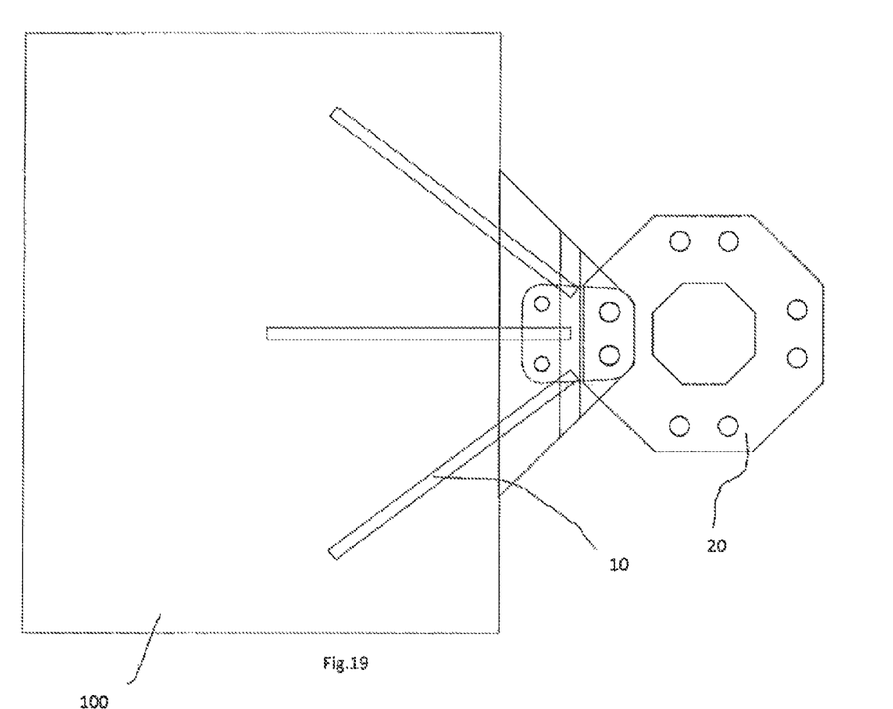
FIG. 19 shows a view of a connection element fixed to a panel with a connection plate.
Figure 20:
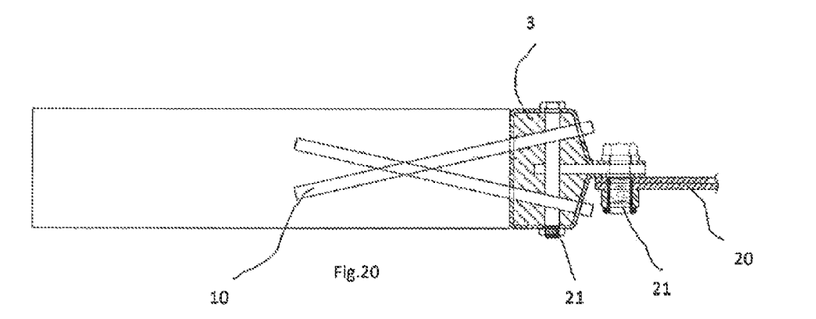
FIG. 20 shows a section of the view of FIG. 19.

FIGS. 19 and 20 show an element according to FIGS. 17 and 18 with a connection means 20. This connection means is fixed to the housing. In this way the connection is more stable and secure.

Figure 21:
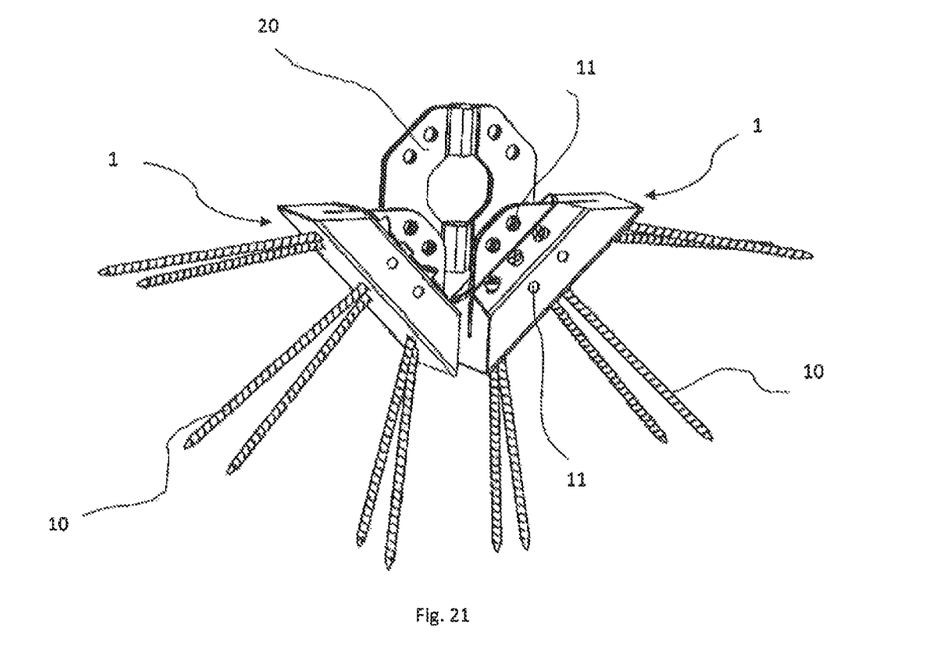
FIG. 21 shows two connection elements connected by means of a plate with fixing elements.

FIG. 21 shows a connection of two connection elements according to the invention connected to each other by means of a plate 20 and with a series of anchoring means 10 fixed on building components (not shown).

Figure 22:
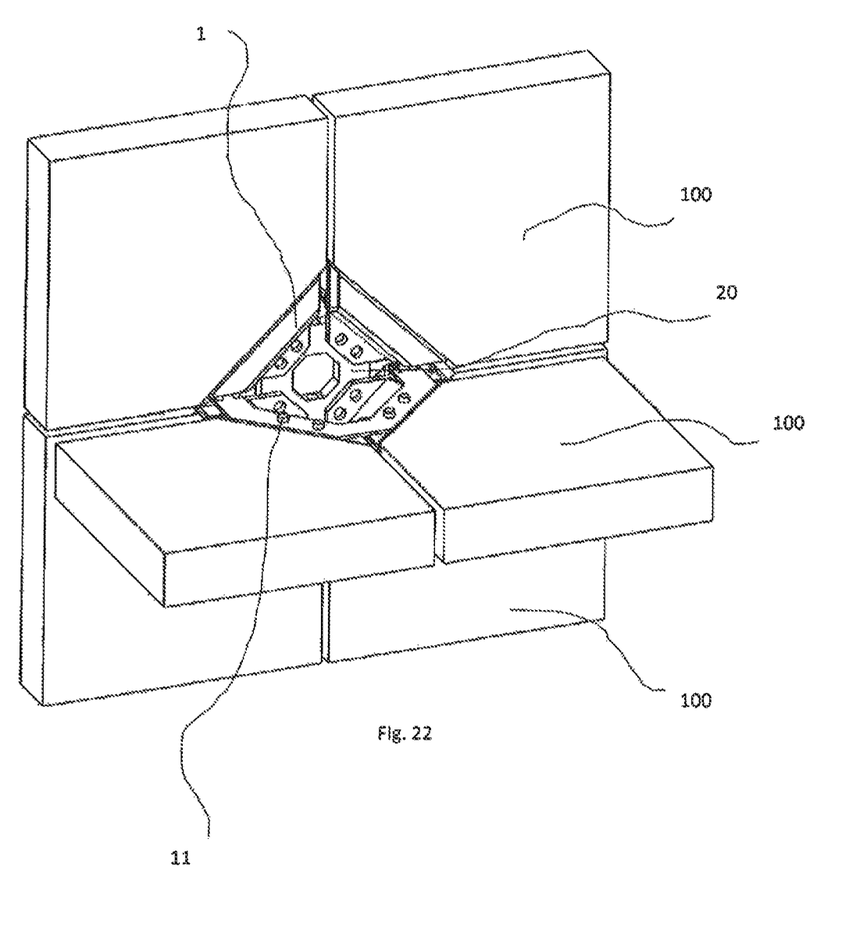
FIG. 22 shows a three-dimensional structure created by means of connection elements and building elements.

FIG. 22 shows a three dimensional structure created by means of the connection element 1 according to the invention connecting a series of building components 100 whose centre is a plate 20.

Key of reference numbers 1 connection element
2 case
2a upper part of case
2b lower part of case
3 filling material
10 anchoring elements
11 gripping means
20 connection means
21 fixing means
100 building elements

The invention claimed is:

1. A connection element for building components, wherein the connection element is adapted to be arranged opposite on an external surface of a building component, the connection element having a body, the body comprising a case formed by a material and containing at least one filling material within said case, where said filling material is more elastic than a material forming said case, said case and said filling material receiving a plurality of through anchoring elements which can be fixed to said building component and each of the anchoring elements cross said case at least twice and the filing material being in contact with the anchoring elements, and wherein the anchoring elements are positioned in a dovetail arrangement that is inclined or crossed;

wherein the case is sectionally M-shaped with a closed bottom such that the case has a closed perimeter;

wherein said element comprises at least one gripping means; and wherein said filling material has at least one hole for said anchoring element.

2. The element according to claim 1, wherein the building component is of the multi-layer type.

3. The element according to claim 1, wherein said connection element can be connected with at least one second connection element.

4. The element according to claim 1, wherein said filling material has at least one hole for said anchoring element.

5. The element according to claim 1, wherein within said case at least one further case containing the filling material is arranged.

6. The element according to claim 1, wherein said filling material is aluminium.

7. The element according to claim 1, wherein said filling material is resin.

8. The element according to claim 1, wherein said filling material is wood or a wood-based composite.

9. The element according to claim 1, wherein said case comprises at least two filling materials.

10. The element according to claim 1, wherein the anchoring elements are inserted into the case in different angles such that the anchoring element and the case together form a triangular prism shape with a flat top.

* * * * *